United States Patent [19]

Weilbach et al.

[11] Patent Number: 5,019,738

[45] Date of Patent: May 28, 1991

[54] SELF-PRESSURIZING GAS SUPPORTED SURFACE-ROUGHNESS BEARING

[75] Inventors: August O. Weilbach, La Habra, Calif.; Derald F. Hanson; C. Dwight Smith, both of Phoenix, Ariz.

[73] Assignee: Lincoln Laser Company, Phoenix, Ariz.

[21] Appl. No.: 568,416

[22] Filed: Jul. 16, 1990

[51] Int. Cl.$^5$ .................. F16C 17/04; F16C 39/06; H02K 5/16; H02K 7/09
[52] U.S. Cl. .................... 310/90.5; 310/90; 384/100; 384/276; 384/625
[58] Field of Search .............. 310/42, 77, 90, 90.5; 384/100, 129, 276, 625

[56] References Cited

U.S. PATENT DOCUMENTS

| | | |
|---|---|---|
| 3,284,144 | 11/1966 | Moore et al. |
| 3,899,223 | 8/1975 | Baermann |
| 4,487,514 | 12/1984 | Mori ........................... 384/113 |
| 4,538,081 | 8/1985 | Kamiya et al. ................ 310/90 |
| 4,552,417 | 11/1985 | Yamashita et al. ............ 310/90 |
| 4,820,950 | 4/1989 | Hijiya et al. ................. 310/90.5 |
| 4,973,068 | 11/1990 | Lebeck ........................ 384/625 |

OTHER PUBLICATIONS

Article by J. W. White from the Jan. 1983 Journal of Lubrication Technology, vol. 105/131, entitled "The Effect of Two-Sided Surface Roughness On Ultra-Thin Gas Films", pp. 131–137.

Paper No. 20, by M. J. Devine, et al., entitled "Solid Lubricants" received at the Institution of Mechanical Engineers on May 15, 1967; pp. 1–9.

Primary Examiner—Steven L. Stephan
Assistant Examiner—D. L. Rebsch
Attorney, Agent, or Firm—Cahill, Sutton & Thomas

[57] ABSTRACT

A self-pressurizing gas supported bearing includes a cylindrical bearing sleeve having a longitudinal axis and a cylindrical inner surface forming a first bearing surface with a random surface texture having a first $R_a$ roughness profile. A cylindrical bearing shaft is positioned coaxially within the bearing sleeve and includes a cylindrical outer surface forming a second bearing surface with a random surface texture having a second $R_a$ roughness profile. The sum of the first and second $R_a$ roughness profiles falls within the range of from about eighteen to sixty. A drive system establishes a relative rotational velocity between the bearing sleeve and the bearing shaft, generating a bearing stiffness force which causes the overlapping bearing surfaces to lift off and break contact. The bearing sleeve and shaft are dimensioned to maintain a predetermined means spacing between the sleeve and shaft. The bearing may also take the form of a linear bearing or other cylindrical configurations.

22 Claims, 9 Drawing Sheets

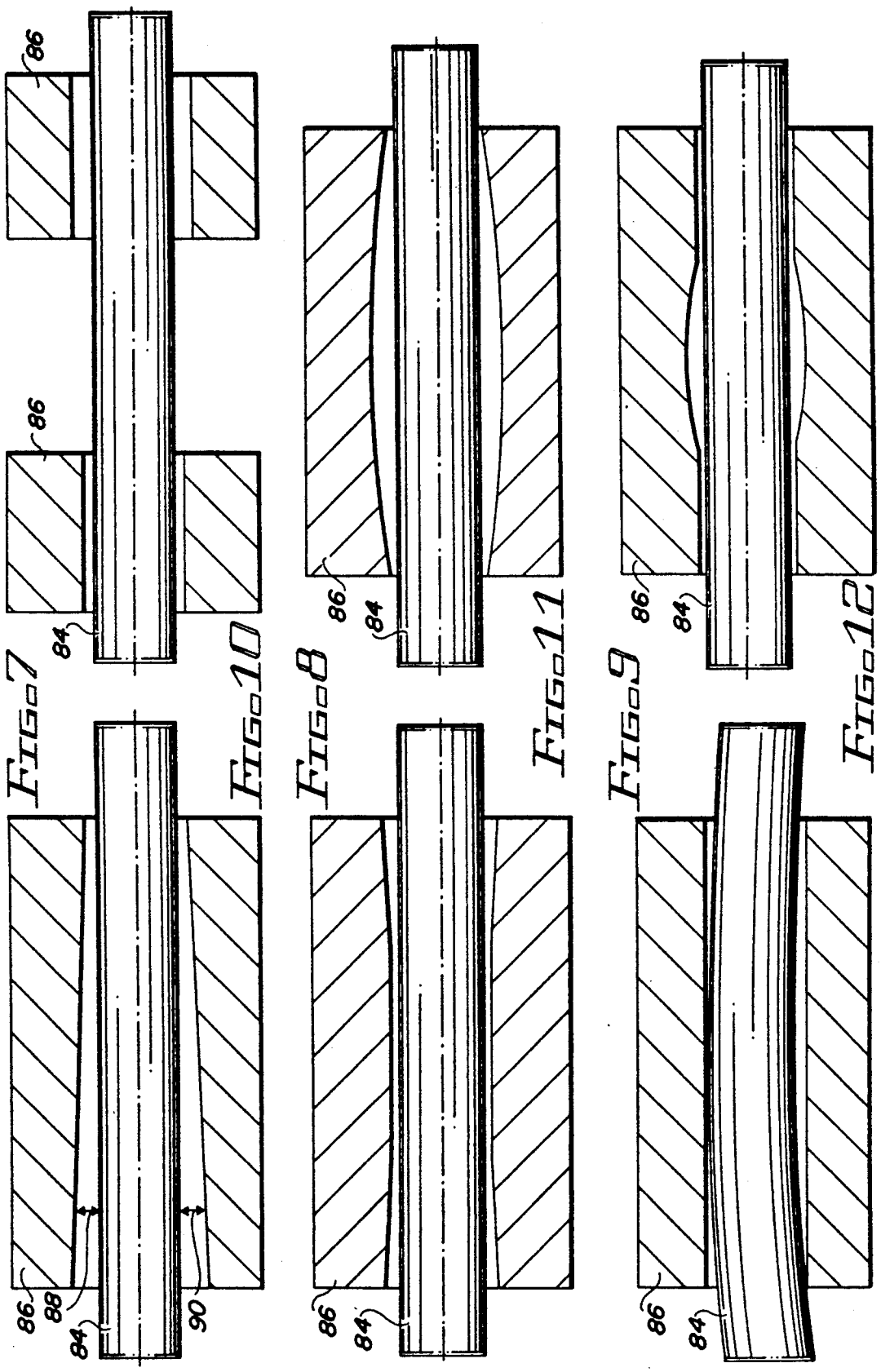

SELF-PRESSURIZING GAS SUPPORTED SURFACE-ROUGHNESS BEARING

BACKGROUND OF THE INVENTION

1. Field of the Invention

This invention relates to self-pressurizing gas supported bearings, and more particularly to high precision, high speed gas supported bearings.

2. Description of the Prior Art

FIGS. 1A and 1B depict a polygon mirror scanning system having a rotating polygon mirror 10 mechanically coupled to a rotating cylindrical shaft 12. The lower end of shaft 12 is rotatably coupled to the scanner housing 14 by ball bearing 16; the upper end of shaft 12 is coupled to housing 14 by ball bearing 18. Seals 20 minimize the circulation of liquid lubricant discharged from ball bearings 16 and 18 during high speed operations.

A permanent magnet 22 is rigidly coupled to shaft 12. When energized, motor field windings 24 interact with magnets 22 to rotate shaft 12 and polygon mirror 10.

Such prior art ball bearing supported motor driven loads respond to dimensional irregularities in the ball and race assemblies of the ball bearing and adverse interaction with the liquid lubricant can generate polygon mirror scanning errors of ten arc seconds or greater depending on the spacing between the two supporting bearing assemblies. Even when selected elements of the ball bearing scanning assembly are custom machined and custom fitted, scanning errors generally cannot be reduced below about five arc seconds. Lube redistribution can contribute to rotational period instability (velocity stability).

The unpreventable circulation of liquid lubricant discharged by the ball bearings enters the interior of housing 14, contaminates the reflective facets of polygon mirror 10, particularly along the leading edge of each facet, and thereby degrades the reflectivity of the mirror. Periodically, the individual facets of polygon mirror 10 must be cleaned to remove contaminating lubrication.

The prior art herringbone bearing assembly illustrated in FIG. 2 includes a cylindrical bore 26 and a shaft 28. Shaft 28 includes discrete herringbone patterns designated by reference numbers 30 and 32. Each herringbone pattern must be formed with the highest possible precision in the outer surface of shaft 38. As illustrated by the edge of the sectional view of shaft 28 as designated by reference number 34, approximately fifty percent of the shaft surface area within the herringbone pattern area is removed so that only approximately fifty percent of the remaining shaft surface can form a load supporting surface between the rotating shaft and the uninterrupted, cylindrical surface of the sleeve bore 26. This sharply limited load supporting surface area drastically reduces the load supporting forces or bearing stiffness generated between shaft 28 and sleeve 26. As a direct result, the closely spaced surfaces of shaft 28 and sleeve bore 26 do not lift off and become airborne until the grooves become pressurized. From 0 RPM to lift off velocity, these two surfaces operate as a contact bearing and mechanically rub against each other generating significant frictional forces and bearing surface wear.

The herringbone air bearing depicted in FIG. 2 relies upon the air pumping action generated by the interaction between the relatively rotating sleeve bore 26 and shaft 28. Such pumping forces generate a flow of pressurized air in the direction indicated by arrows 36 flowing upward through the bearing surface and are discharged from air discharge port 38. Once appropriate pressurization has been established by the rotating sleeve assembly, the sleeve bore 26 becomes airborne relative to the crowned top of the shaft 28. Until liftoff occurs, the top of shaft 28 rubs upon and can create surface wear at the interface between the top of shaft 28 and the base of air discharge port 38.

Another disadvantage of herringbone air bearings of the type depicted in FIG. 2 is that they must be operated in a vertical orientation. Deviation from the desired vertical alignment on the order of ten degrees of inclination can create rapid bearing surface wear and can result in failure of the herringbone bearing assembly.

The high level of mechanical precision required to create the herringbone pattern in the surface of bearing shaft 28 contributes to a high manufacturing cost.

SUMMARY OF THE INVENTION

It is therefore a primary object of the present invention to provide a high precision, self-pressurizing gas supported bearing to rapidly and at low velocity build up high level bearing stiffness on the order of about 30,000 to 50,000 pounds per inch capable of operation over a wide speed range.

Another object of the present invention is to provide a high precision, self-pressurizing gas supported bearing which produces lift off of the bearing sleeve relative to the bearing shaft at relatively low velocity.

Another object of the present invention is to provide a high precision, self-pressurizing gas supported bearing which generates extremely high level bearing stiffness forces enabling operation of the bearing horizontally, vertically or in any intermediate attitude over a broad speed range.

Another object of the present invention is to provide a high precision, self-pressurizing gas supported bearing which is capable of bidirectional operation.

Another object of the present invention is to provide a high precision, self-pressurizing gas supported bearing capable of operation as a closed system to reduce problems caused by pumping debris into the bearing air gap.

Another object of the present invention is to provide a high precision, self-pressurizing gas supported bearing which is capable of a minimum of 20,000 start/stop cycles.

Briefly stated, and in accord with one embodiment of the invention, a self-pressurized gas supported bearing includes a cylindrical bearing sleeve having a longitudinal axis and a cylindrical inner surface including a first bearing surface with a random surface texture having a first $R_a$ roughness profile and a cylindrical bearing shaft positioned coaxially within the bearing sleeve. The bearing shaft includes a cylindrical outer surface having a second bearing surface with a random surface texture having a second $R_a$ roughness profile. The sum of the first and second $R_a$ roughness profiles falls within the range of from about eighteen to about sixty. The bearing sleeve and shaft are aligned along the longitudinal axis such that the first and second bearing surfaces overlap. Drive means establishes a relative rotational velocity between the bearing sleeve and the bearing shaft where the relative rotational velocity generates a bearing stiffness force and causes the overlapping bearing surfaces of the sleeve and shaft to lift off and break contact. The bearing sleeve and shaft are sized to maintain a predetermined mean spacing between the first bearing surface of the sleeve and the overlapping second bearing surface of the shaft of from a minimum of about seventy-five microinches to a maximum mean spacing where the first and second bearing surfaces fail to lift off and break contact. The bearing of the present invention can also be configured as a linear bearing.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 7 illustrates a cylindrical bearing shaft and sleeve where the geometry of the bearing gap changes as a result of taper error.

FIG. 8 illustrates a cylindrical bearing shaft and sleeve including bell mouth geometric errors at each end of the bearing assembly.

FIG. 9 illustrates the shaft and sleeve of a cylindrical bearing including a non-uniform air gap caused by a bowed shaft.

FIG. 10 illustrates a bearing assembly including a single shaft with two spaced apart sleeve elements where the gap between the shaft and sleeve for each bearing element is non-uniform.

FIG. 11 illustrates the shaft and sleeve of an air bearing illustrating geometric errors due to barrel effect.

FIG. 12 illustrates the shaft and sleeve of an air bearing illustrating geometric errors in the central portion of the sleeve bore.

DESCRIPTION OF THE PREFERRED EMBODIMENT

In order to better illustrate the advantages of the invention and its contributions to the art, a preferred hardware embodiment of the invention will now be described in some detail.

Figure 3:
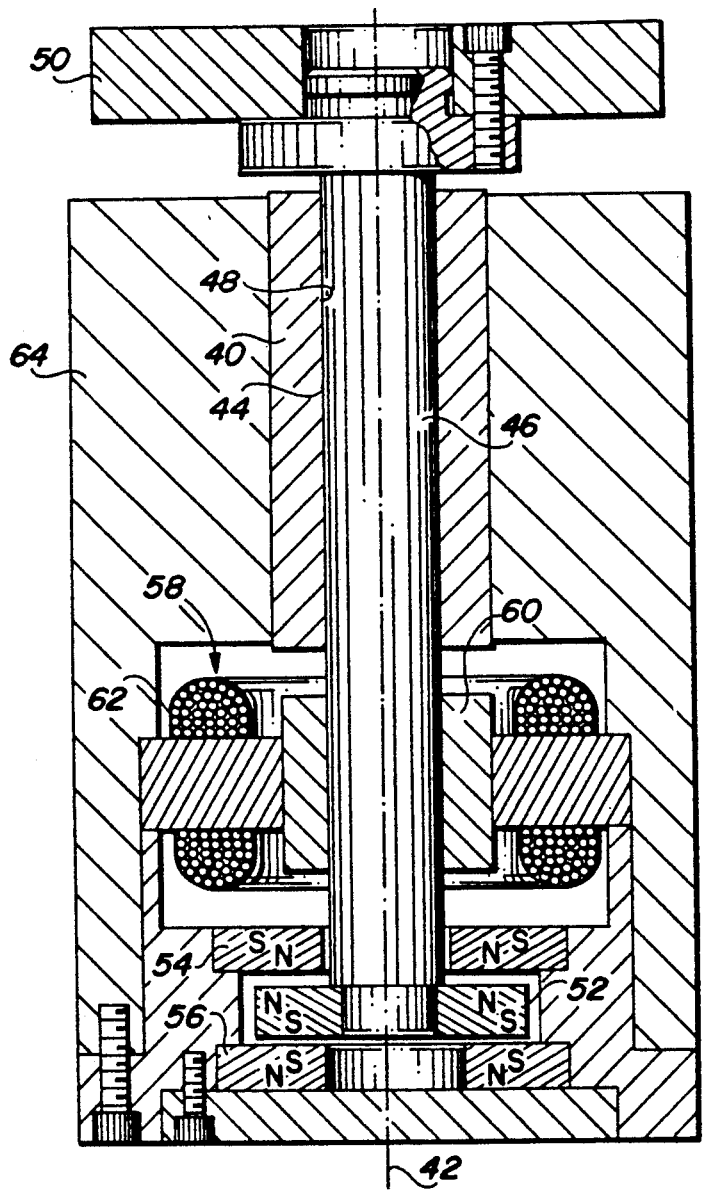
FIG. 3 represents a sectional view of a polygon mirror scanner including a self-pressurizing gas supported bearing of the present invention. In this embodiment of the invention, the cylindrical bearing shaft is rotated relative to a fixed cylindrical bearing sleeve.

Referring now to FIG. 3, a self-pressurized gas supported bearing includes a cylindrical bearing sleeve 40 having a longitudinal axis 42 and a cylindrical inner surface 44 which forms a first bearing surface.

A cylindrical bearing shaft 46 is positioned coaxially within bearing sleeve 40 and includes a cylindrical outer surface 48 which forms a second bearing surface. The upper end of shaft 46 is rigidly coupled to support a load such as a rotatable polygon scanning mirror 50.

The lower end of shaft 46 is coupled to an annular magnet assembly 52 which forms a part of an axial thrust bearing assembly which also includes a non-rotating annular magnets 54 and 56. As shown in FIG. 3, magnets 52, 54 and 56 are positioned with opposing poles to create magnetic repulsion forces both above and below rotating magnet 52. These essentially equal magnetic repulsion forces maintain an essentially fixed spacing on the order of about 0.030 inches between magnets 52 and 54 as well as between magnet 52 and magnet 56 to maintain an essentially fixed axially alignment for both shaft 56 and a load such as polygon mirror 50.

Although this particular axial thrust bearing design works well, numerous other types of axial thrust bearing assemblies well known to one of ordinary skill in the art could easily be substituted for the magnetic axial thrust assembly illustrated in FIG. 3.

Drive means in the form of an electric motor 58 is coupled to establish a desired relative rotational velocity between bearing sleeve 40 and bearing shaft 46. In FIG. 3, electric motor 58 includes a permanent magnet assembly 60 which is rigidly coupled to the outer surface of shaft 46 and a field winding 62 which is rigidly coupled to the non-rotating assembly housing 64.

Figure 4A:
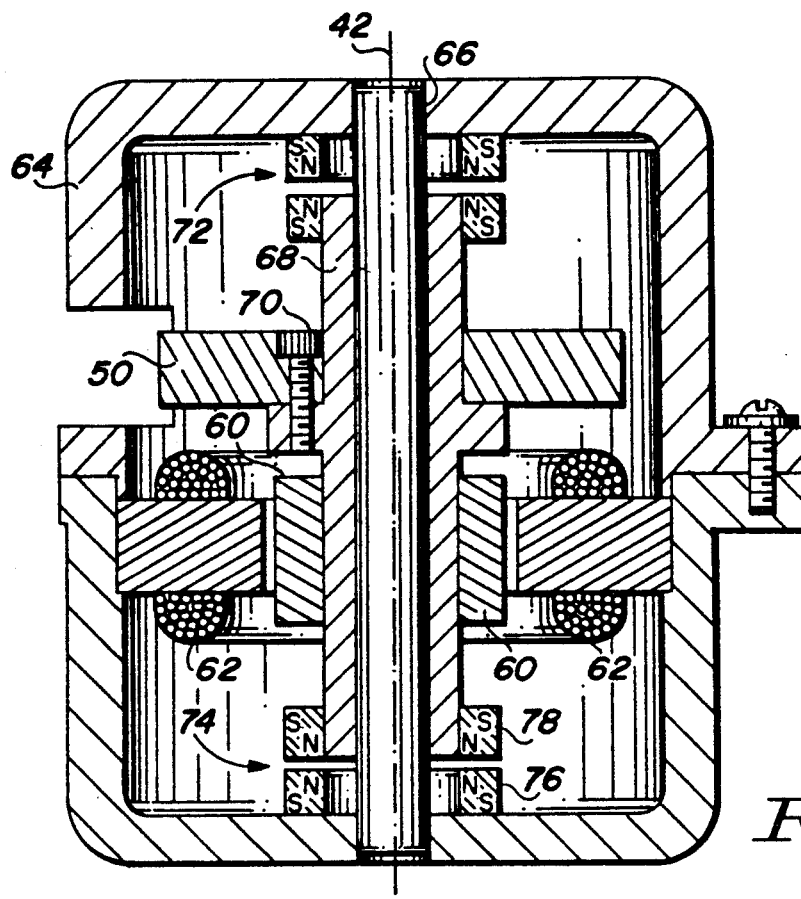
FIG. 4A represents a sectional view of a polygon mirror scanner including a self-pressurizing gas supported bearing of the present invention. In this embodiment of the invention, the cylindrical bearing sleeve rotates about a stationary cylindrical shaft.
Figure 4B:
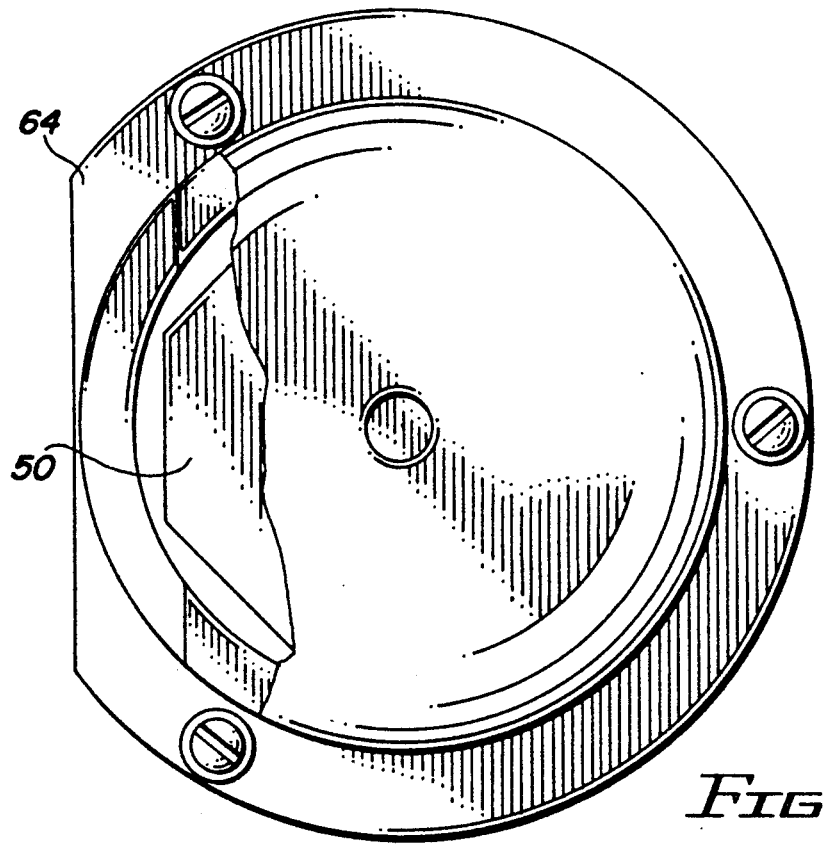
FIG. 4B is a partially cutaway top perspective view of the polygon mirror scanner depicted in FIG. 4A.

Referring now to FIGS. 4A and 4B, another embodiment of the self-pressurizing gas supported bearing of the present invention utilizing a fixed shaft and a rotating sleeve will now be described in detail.

FIG. 4A illustrates that bearing shaft 66 includes upper and lower ends which are rigidly coupled to cylindrical apertures in opposing ends of housing 64. Rotating bearing sleeve 68 is positioned coaxially outside of the bearing shaft. A load such as a rotating polygon mirror is mechanically secured to rotating sleeve 68 by a plurality of screws 70.

Axial thrust control magnet assemblies 72 and 74 are comparable to the assembly described in FIG. 3 are located at the upper and lower ends of rotating sleeve 68 to maintain essentially fixed axial or longitudinal position of sleeve 68 relative to shaft 66. Each magnet assembly includes a non-rotating magnet 76 and a rotating magnet assembly 78 which is rigidly coupled to each end of rotating sleeve 68.

Figure 5A:
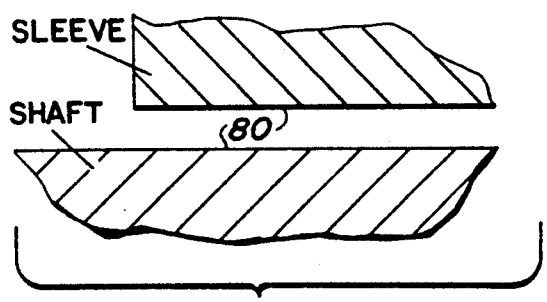
FIG. 5A represents a partially cutaway, illustrative sectional view showing the smooth bearing surfaces typical of prior art bearing structures.
Figure 5B:
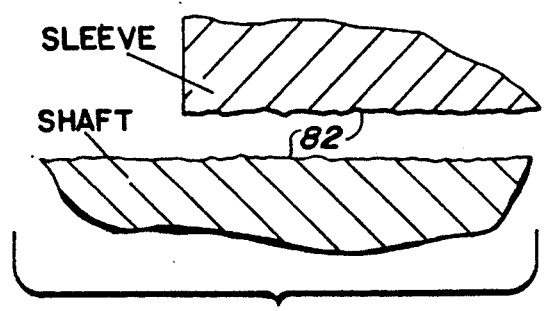
FIG. 5B represents a partially cutaway, illustrative sectional view showing the bearing surfaces of the present invention including a defined surface roughness.

Referring now to FIGS. 5A and 5B, prior art self-pressurizing gas supported bearings virtually universally use extremely smooth, highly polished bearing surfaces designated by reference number 80 in FIG. 5A. FIG. 5B illustrates the corresponding sleeve and shaft bearing surfaces of the self-pressurizing gas supported bearing of the present invention which necessarily include a quantified degree of roughness to the opposing bearing surfaces as illustrated by the bearing surfaces designated by reference number 82.

Figure 6A:
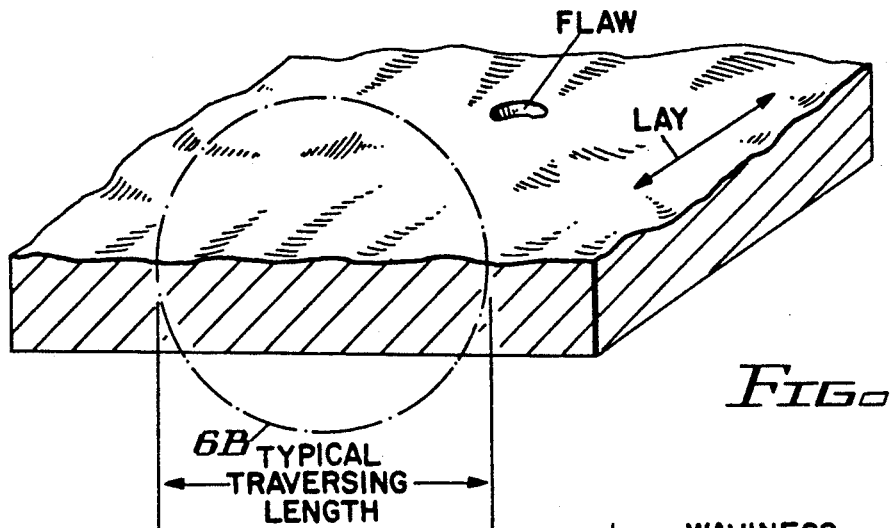
FIGS. 6A, 6B and 6C represent a series of views used to define mechanical engineering terms including Roughness Average $R_a$.
Figure 6B:
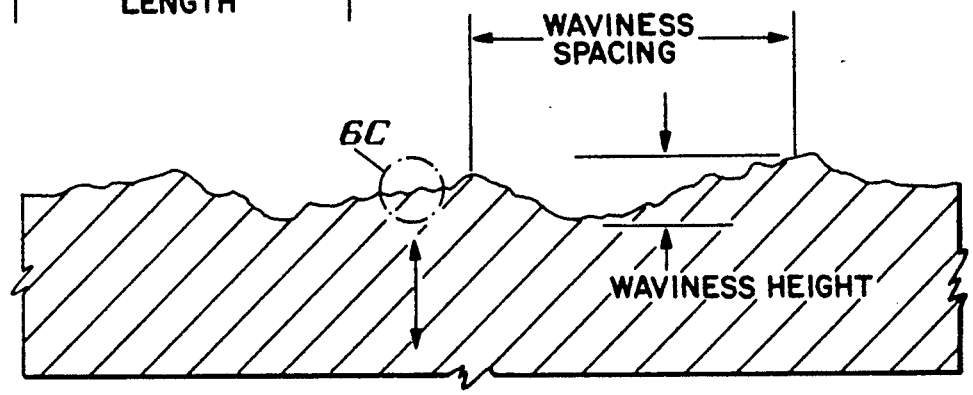
Figure 6C:
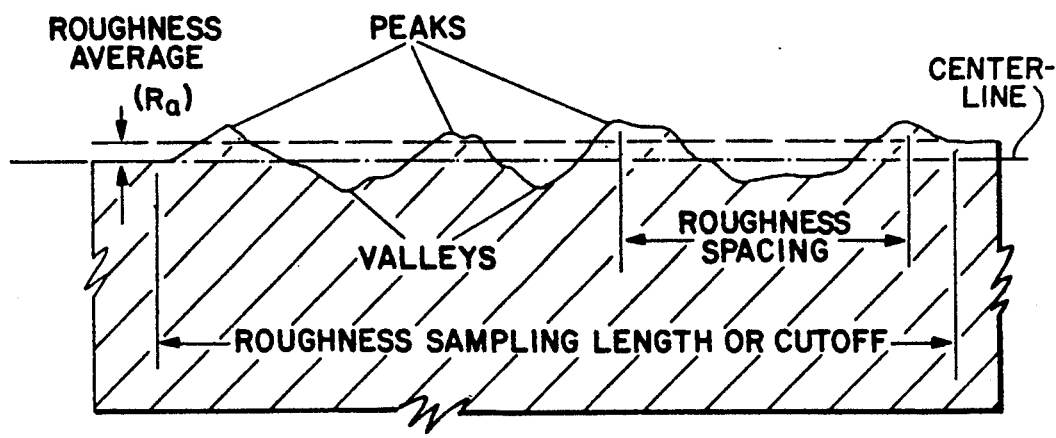

Referring now to FIGS. 6A, 6B and 6C, specific engineering terms relating to measurement of surface texture will now be reviewed to assist in defining the relevant roughness characteristics of the bearing surfaces 82 of the present invention.

Surface texture is generally recognized in mechanical engineering to include the following four characteristics:

1. Roughness—the finer irregularities in surface texture;
2. Waviness—the more widely spaced component of surface texture;
3. Lay—the direction of the predominant surface pattern; and
4. Flaws—the unexpected, unwanted surface texture.

FIG. 6A represents a perspective view of a segment of a surface intended to represent a reasonably linear surface. FIG. 6B represents an enlarged partial sectional view of the surface illustrated in FIG. 6A illustrating the surface texture characteristic of waviness. FIG. 6C represents an enlarged sectional view taken from FIG. 6B illustrating the absolute variations of surface height including peaks and valleys. Roughness Average designated by the symbol $R_a$ is graphically illustrated in FIG. 6C and is defined in mechanical engineering terms as meaning the arithmetic average of the absolute values of measured profile height deviations taken within the sampling length and measured from the graphical centerline. Roughness Average or $R_a$ is universally expressed in micrometers.

The $R_a$ parameters and limitations of the bearing surfaces of present invention will be expressed in terms of $R_a$. $R_a$ is further defined by MIL STD-10A dated 10/13/55 and is measured by readily available commercial test equipment such as Surftest Model 211 Surface Profilometer manufactured by Mitotoy of Japan.

The self-pressurizing gas supported bearing of the present invention can be implemented by using a variety of materials for the sleeve and shaft elements of the present invention as illustrated in FIGS. 3, 4 and 5B. Specially, the material combinations listed in Table 1 below have found to provide successful bearing surfaces for use in the present invention:

TABLE 1

| | SLEEVE | SHAFT |
|---|---|---|
| 1. | Steel | Ceramic |
| 2. | Hard anodized aluminum | Steel |
| 3. | Hard anodized aluminum | Ceramic |
| 4. | Hard anodized aluminum | Hard anodized aluminum |
| 5. | Ceramic | Ceramic |
| 6. | Ceramic | Steel |

To create a high precision, self-pressurizing gas supported bearing according to the present invention, four different parameters must be carefully controlled within defined limits. When such parameter control is properly implemented, a high precision bearing assembly can be created yielding non-repeatable errors significantly less than five arc seconds and typically equal to or better than one arc second at ambient temperature. At higher temperatures on the order of 62° C. (140° F.), such non-repeatable errors can typically be controlled to a level equal to or less than about two to three arc seconds. Such accuracy is virtually an order of magnitude better than has been attained by ball bearing assemblies typically used in high precision scanning systems including photocopy machines, laser printers and related devices.

The first parameter which must be controlled to produce the high precision bearing of the present invention is referred to as the bearing geometry which includes the subcategory parameters of straightness, roundness and size uniformity. With cylindrical bearing configurations, the parameter of size uniformity includes both barrel and taper errors.

Referring now to FIGS. 7–12, the various types of geometry and geometric errors will now be briefly discussed although such terminology is well known to those of ordinary skill in the art.

FIG. 7 represents a relatively straight shaft 84 which is disposed within a sleeve 86 having a tapered bore. Such taper size uniformity variations create a non-uniform gap between shaft 84 and sleeve 86 which can, if excessive, degrade the performance of the bearing of the present invention.

FIG. 8 illustrates a straight shaft 84 positioned within sleeve 86 having a bore demonstrating bell mouth size uniformity variation at each end.

FIG. 9 illustrates a bowed shaft 84 within sleeve 86 having a highly accurate bore, creating a non-uniform air gap due to the lack of straightness of shaft 84.

FIG. 10 illustrates a dual bearing assembly defined by a single shaft 84 and a pair of sleeves 86. A non-uniform gap is created as a result of differential bore diameters between left hand sleeve 86 and right hand sleeve 86.

FIG. 11 illustrates a bearing assembly having a straight shaft with a sleeve 86 having a barrel configuration geometric error creating a non-uniform gap between the shaft and sleeve.

FIG. 12 illustrates a bearing assembly having a non-uniform gap produced by a barrel configuration error within the central portion of the bore of sleeve 86.

In implementing the present invention, the geometry of the shaft and sleeve elements of the present invention must be controlled within defined limits to create the desired, inventive function of the present invention.

Specifically, as illustrated by FIG. 7, the geometry variations within the gap of the bearing assembly of the present invention must be controlled to limit the gap between the sleeve and the shaft to a total distance across the bearing of approximately equal to or greater than about 100 microinches up to less than about 350 microinches. As illustrated in FIG. 7, the first radial component of the overall gap dimension designated by reference number 88 is added to the second radial component of the gap dimension designated by reference number 90. The sum of the gap dimensional contributions designated by reference numbers 88 and 90 should fall within the range of between about two hundred microinches to about three hundred microinches to create a successful properly functioning gas bearing from the materials listed in Table 1.

For newly discovered materials not expressly listed in Table 1, the minimum gap dimension of one hundred microinches should apply, but the maximum gap dimension could conceivably increase above the typical three hundred microinch upper limit if such previously untested material can cause the two opposing bearing surfaces to lift off and become airborne at an velocity below the bearing operating velocity. One bearing element becomes airborne relative to the other bearing element when sufficient bearing stiffness is created between the relatively rotating bearing surfaces and the intervening gaseous layer moves the two surfaces out of mechanical contact with each other.

Figure 13:
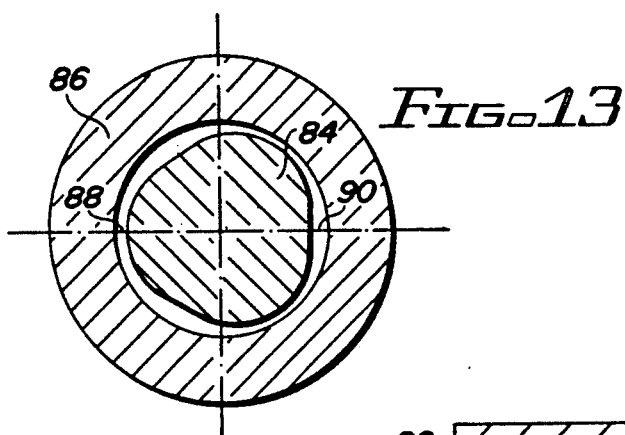
FIG. 13 is a sectional view of a cylindrical air bearing assembly including a shaft and sleeve illustrating the variation in gap dimension caused by geometric errors.

FIG. 13 represents a sectional view of shaft 84 and sleeve 86 further illustrating the diametrically spaced apart gap elements 88 and 90 which must be controlled to fall within the limits of the present invention.

Figure 14:
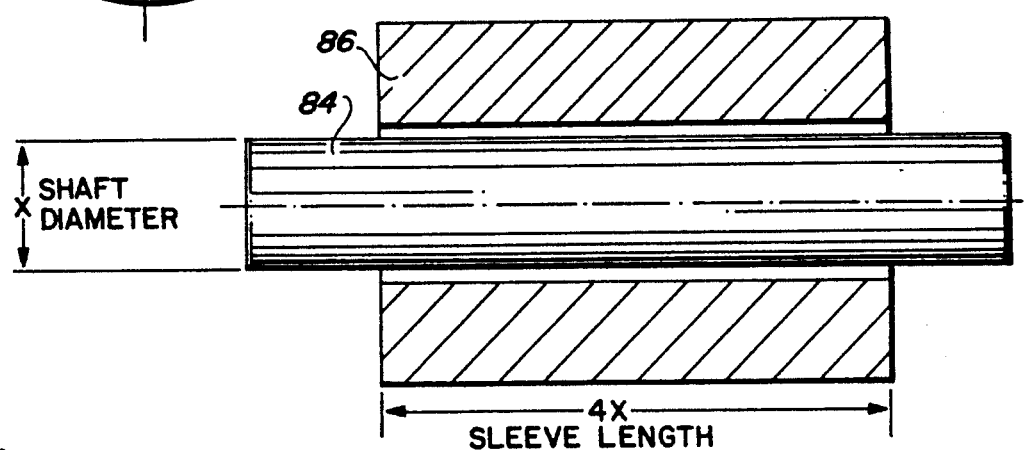
FIG. 14 defines the bearing aspect ratio as determined by the ratio of bearing shaft diameter to bearing sleeve length.

Referring now to FIG. 14, another geometry-related aspect of the present invention which must be controlled relates to the ratio of the shaft diameter designated by dimension "X" to sleeve length. The aspect ratio of sleeve length to shaft diameter for materials of the type listed in Table 1 must typically substantially equal three to one, and most preferably equal about four to one or greater. Although there is no upper limit on the maximum aspect ratio of sleeve length to shaft ratio, as a practical matter, substantially longer sleeve lengths create serious difficulties relating to maintenance of the geometric gap limits of the present invention. As the length of the sleeve increases for a given shaft diameter, it becomes more difficult and much more expensive to maintain the required cylindricity necessary to implement the present invention.

The next parameter which must be controlled to implement the self-pressurizing gas supported bearing of the present invention is the surface texture or $R_a$ of the bearing surfaces. To achieve proper high accuracy, low wear characteristics of the present invention, the sum of the $R_a$ contributions from both the sleeve and the shaft must be approximately equal to or greater than about a minimum $R_a$ of eighteen (relatively smooth) and a maximum $R_a$ of 60 (relatively rough).

For the materials listed in Table 1, it has been found that although the sum of the $R_a$ contributions of the sleeve $R_a$ plus the shaft $R_a$ must approximately equal or exceed eighteen, it has also be found that if the $R_a$ of either the sleeve or the shaft falls below a minimum $R_a$ rating, the bearing of the present invention will not operate properly. For example, the minimum $R_a$ for the sleeve must be about equal to or greater than an $R_a$ of four while the minimum $R_a$ of the shaft must be approximately equal to or greater than about seven. In all cases, the $R_a$ total must either approximately equal or exceed eighteen. For an $R_a$ rating for the sleeve on the order of about four, the $R_a$ contribution of the shaft must be approximately equal to or greater than fourteen. Similarly, for a minimum $R_a$ shaft rating on the order of about seven, the sleeve $R_a$ must be about equal to or greater than about eleven.

When the $R_a$ of the sleeve plus the shaft falls below about an $R_a$ of eighteen, the bearing stiffness decreases and the well known phenomena of bearing coning increases, causing wobble of the load. In the rotating polygon mirror scanner embodiment illustrated in FIGS. 3 and 4, such coning errors translate into increased angular deviations of the output beam of the optical scanner. A similar phenomena occurs when the overall $R_a$ rating increases above about sixty or when the geometric errors exceed about one hundred microinches total.

The last parameter which must be controlled to create the self-pressurizing gas supported bearing of the present invention relates to the ratio of randomly distributed depressions in the bearing surface to the overall area of each bearing surface. As will be explained below, the bearing surface of both the sleeve and shaft must be specially selected and treated to include a predetermined minimum and maximum ratio of depressions capable of creating air reservoirs for the overall bearing surface area. In certain materials, these air reservoir-forming depressions take the form of grooves, cross hatching patterns or pockets.

Figure 15A:
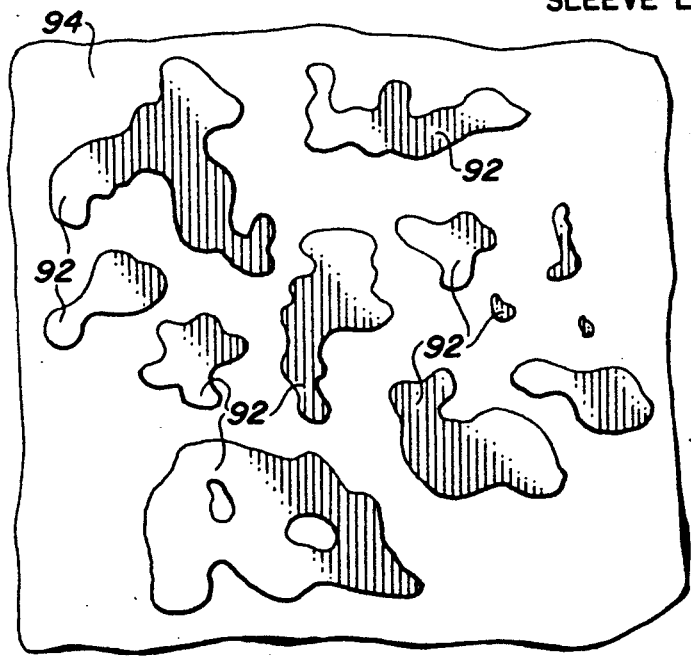
FIG. 15A illustrates the relative area of lands and grooves of a ceramic shaft.
Figure 15B:
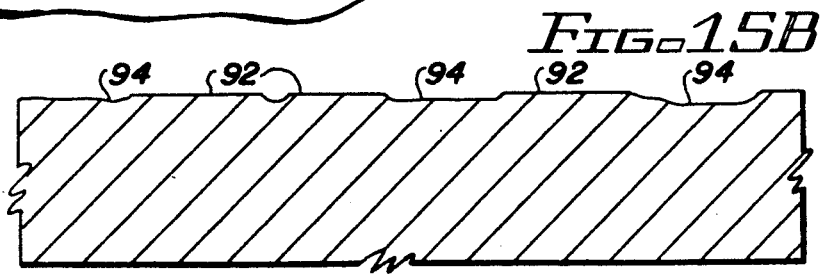
FIG. 15B is a partially cutaway sectional view illustrating the lands and grooves of a ceramic shaft.

Referring now to FIGS. 15A and 15B, the ratio of depressions or grooves to overall bearing surface for a ceramic shaft application will now be explained in detail.

The shaded sections of FIG. 15A represent the raised areas or lands 92 of an alumina ceramic shaft together with the intervening low spots or grooves located adjacent to each land. The grooves or depressed areas 94 create air reservoirs or pockets which are critical to the proper function of the bearing of the present invention.

For the bearing surface materials designated in Table 1, the overall area of the pockets or air reservoirs must be equal to or less than about fifty percent of the overall surface area of the bearing. For optimum performance levels, the area of the pockets or air reservoirs should fall generally within the range of about thirty to fifty percent of the overall bearing surface area such that the area of the lands 92 of the bearing representing the load bearing surface encompasses approximately fifty to seventy percent of the overall surface area.

For ceramic bearing materials of the type schematically illustrated in FIG. 15, microphotographs enlarged to approximately 300× permit visual inspection of the air pockets and lands of the ceramic material and facilitate computation of the ratio of the air pockets to the overall ceramic surface area.

Figure 16A:
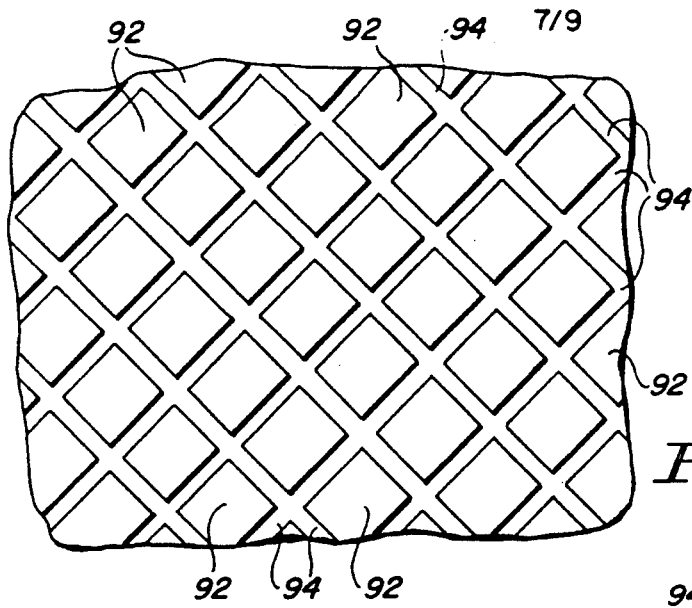
FIG. 16A illustrates a random cross-hatched roughness pattern added to the surface of a metal bearing element.
Figure 16B:
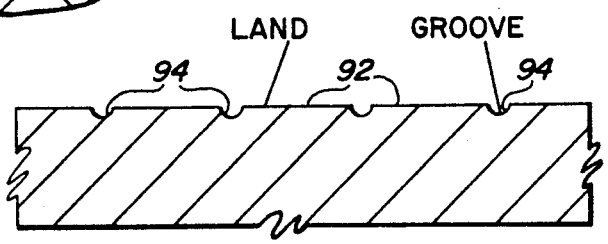
FIG. 16B is partially cutaway sectional view of the bearing element illustrated in FIG. 16A, illustrating alternating lands and grooves.

Referring now to FIG. 16, FIG. 16A illustrates a partially cutaway perspective view of the surface of a steel or aluminum shaft or sleeve which has been treated by a honing process, or with abrasive technology or other methods to yield a random cross hatched pattern of lands 92 and grooves 94. In this embodiment of the invention, the grooves form the air pockets or air reservoirs and the ratio of the groove area to the overall bearing surface area should fall within the predetermined limits recited above.

Figure 17A:
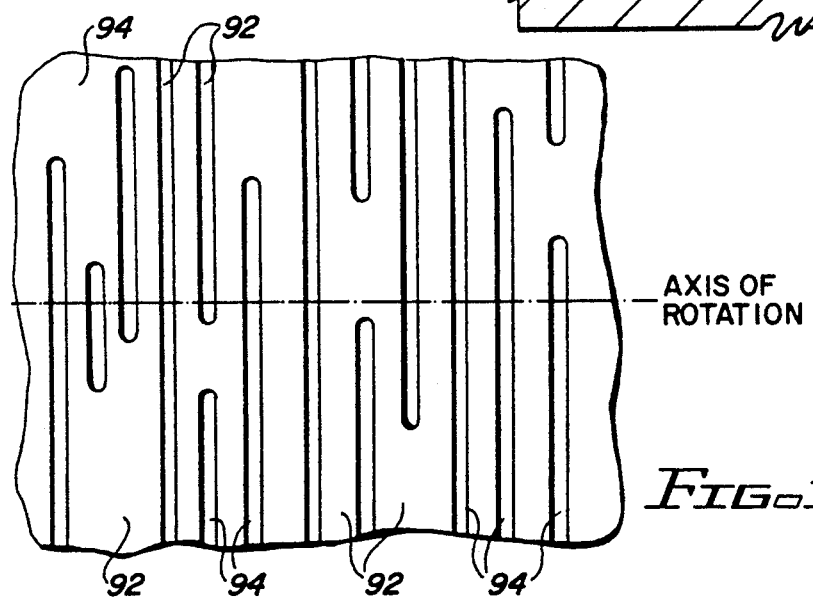
FIG. 17A illustrates random, circumferential grooves in the surface of a metal bearing shaft.
Figure 17B:
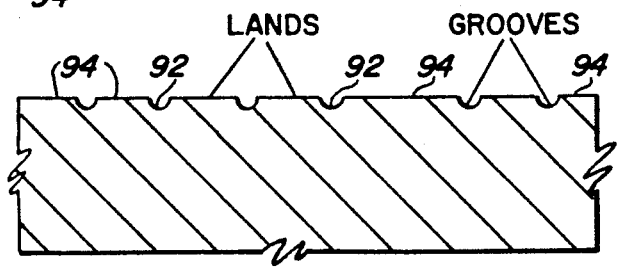
FIG. 17B is a partially cutaway sectional view of the bearing element depicted in FIG. 17A, showing the relationship between bearing lands and grooves.

Referring now to FIG. 17, FIG. 17A represents an enlarged, partially cutaway perspective view of a portion of a steel shaft processed by conventional gauge pin manufacturing techniques to include circumferential grooves 94 perpendicular to the axis of shaft rotation. FIG. 17B represents a partially cutaway sectional view of the lands 92 and grooves 94 illustrated in FIG. 17A. In this application, although the grooves are parallel to one another in a plane perpendicular to axis of rotation, the grooves are of random length and spacing. Such random groove distribution is an essential feature of the present invention.

Figure 1A:
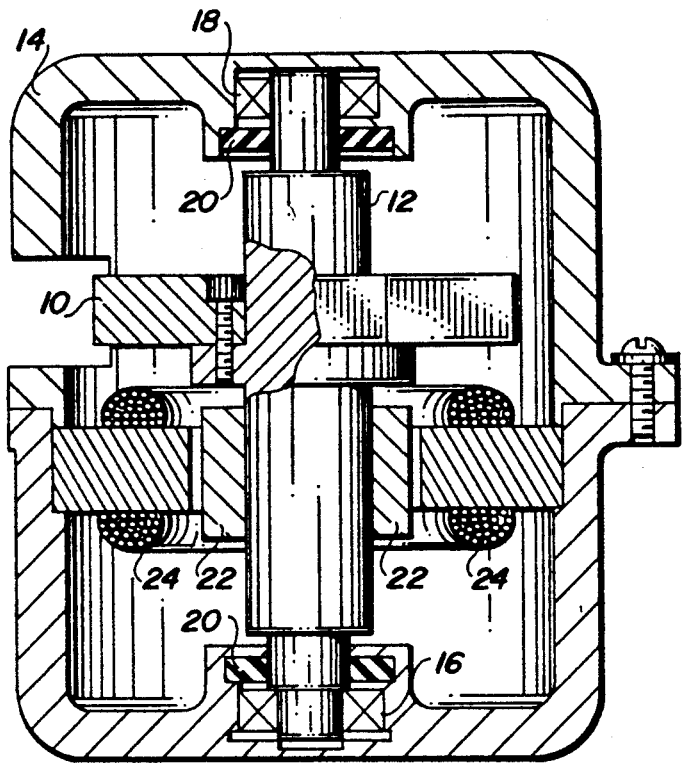
FIG. 1A is a sectional view of a prior art polygon mirror scanner including a rotating cylindrical shaft supported at each end by conventional ball bearings.
Figure 1B:
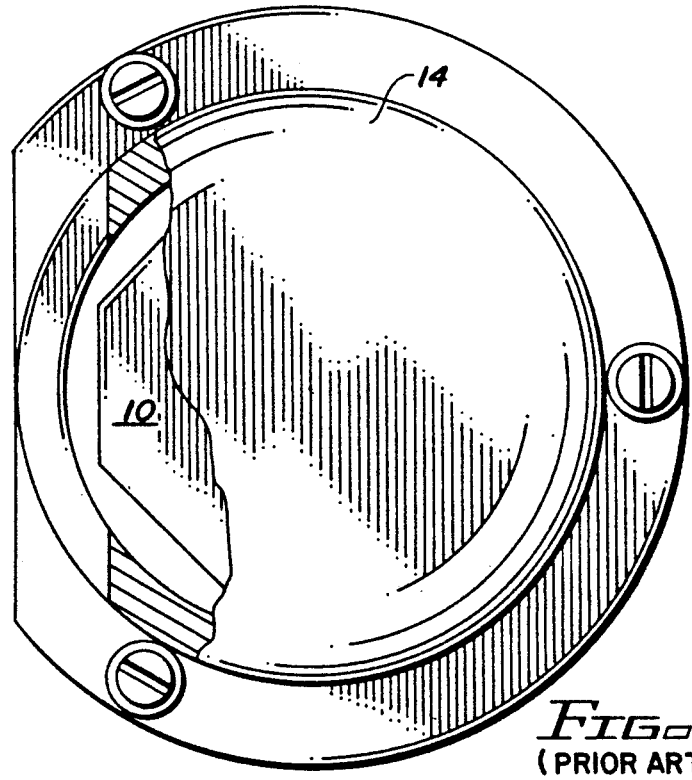
FIG 1B represents a partially cutaway, perspective view of the scanner depicted in FIG. 1A.
Figure 2:
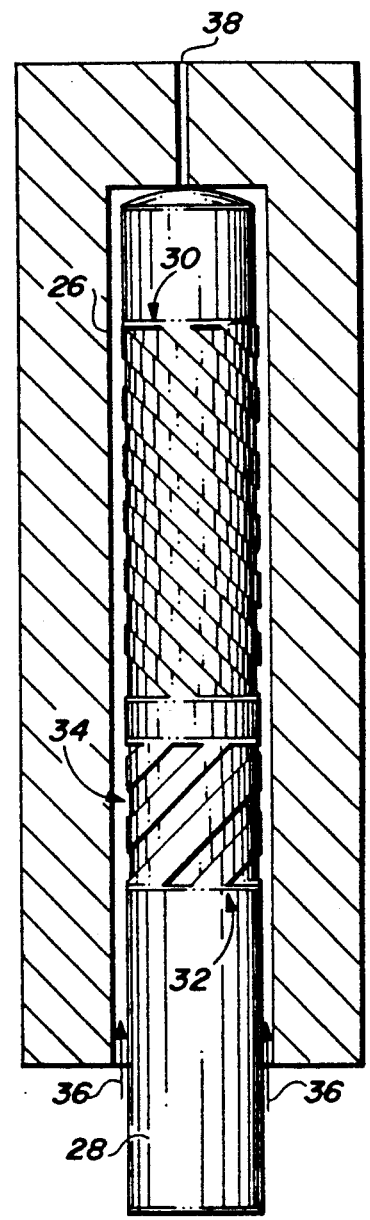
FIG. 2 represents a sectional view of a prior art herringbone gas supported bearing.

In all of the embodiments described in FIGS. 15, 16 and 17, the grooves occur randomly and create a near-infinite number of air pockets or air reservoirs within the overall surface area of the bearing assembly. This configuration of the invention is sharply distinct from the highly patterned, repetitive and highly precise herringbone groove and land pattern described above in connection with FIG. 2.

To determine whether the necessary geometry limits, $R_a$ limits, air reservoir ratio limits and aspect ratio limits have been met, a bearing assembly can be tested by placing the bearing assembly in an operating application such as that illustrated in FIGS. 3 and 4 to determine whether non-repeatable errors have been reduced to an acceptable level for specific applications. Non-repeatable errors of less than one arc second are routinely observed These measurements can be made electronically or optically.

Each of the controllable parameters of the present invention is inherently related to the other parameters. For example, lowering the $R_a$ rating of the bearing surfaces toward the eighteen $R_a$ lower limit of the invention lowers the bearing stiffness and requires implementation of more accurate geometry tolerances to the sleeve/shaft gap to reduce the gap dimension toward the one hundred microinch lower limit. For higher bearing surface $R_a$ ratings, much higher levels of bearing stiffness are created enabling the use of looser bearing gap geometric tolerances toward the upper limit of about three hundred. Similarly, as the ratio of air reservoir or pocket area to overall bearing surface area diminishes toward the lower limit, increased $R_a$ ratings toward the upper limit can be used to compensate.

The numerous interrelationships between bearing gap geometry, $R_a$ rating, air reservoir ratio and aspect ratio clearly demonstrate the empirical relationship between each of these parameters. Meeting the above parameters are necessary to make the present invention work.

A process that is unnecessary to make the present invention work, but may be helpful to extend the start/stop cycle life, is the application of a dry lube which reduces the contact friction which occurs at the start and end of operation when the bearing is not airborne.

The random texture and closed flow design provides for low velocity pressurization and depressurization during the operating cycle.

For each of the different type of bearing surface components identified in Table 1, the method of implementing the required surface treatment will now be described in detail.

For ceramic sleeves or shafts, ceramics having an alumina content of from about 94% to about 99.8% should be provided. Such materials are available from the Ceram Division of the Coors Ceramic Company of El Cahon, Calif. or from the Mindrum Precision Products Company of Rancho Cucamonga, Calif. Either of these organizations can provide ceramic surface finishes over a broad $R_a$ range and can readily provide appropriate ceramic surface $R_a$ ratings to specification.

The geometry of a ceramic shaft or sleeve must be controlled to a cylindricity rating of twenty-five millionths of an inch. This specification is defined by creating two concentric cylinders where the diameters of the inner cylinder is fifty millionths of an inch less than the diameters of the outer cylinder and where the gap between the outer surface of the inner cylinder and the inner surface of the outer cylinder is equal to twenty-five millionths of an inch radially. All parts of the surface of a ceramic element meeting this cylindricity specification must fall within the gap between the two concentric cylinders. Ceramic bearing elements meeting this cylindricity specification also meet all of the relevant geometric parameters of straightness, roundness and size uniformity.

The ratio of air pockets to overall bearing surface area can be inspected by microphotographs with an enlargement of between about 300× to 600×. Optimum performance is achieved when this ratio equals approximately forty to fifty percent.

When all of the above-stated parameters have been achieved, no further treatment of ceramic bearing surfaces is necessary.

When either the bearing sleeve or shaft is fabricated from steel, four hundred and forty stainless steel or its equivalent has found to function acceptably. A cylindricity specification identical to that described above in connection with ceramic materials adequately controls the bearing surface geometry.

One acceptable method of manufacturing a steel sleeve capable of functioning as a bearing element of the present invention involves implementation of the following sequence of steps:

1. Machining the sleeve bore to a slightly undersized diameter;
2. Initially honing the sleeve bore to increase the sleeve diameter to the desired diameter and to achieve the desired surface geometry; and
3. Completing a final honing step to achieve the desired $R_a$ figure within the limits of the invention.

To prepare a 440-steel shaft for use in a bearing of the present invention, the following procedures may be implemented to achieve that purpose:

1. Manufacturing the steel shaft to desired geometry specifications by conventional gauge pin manufacturing techniques including roll lapping the surface of the steel shaft to an $R_a$ of between about two to four; and
2. Rotating the steel shaft on a lathe to roughen the surface of the shaft with 180 grit wet or dry sandpaper where the sandpaper contacts the steel shaft in a first pass with a first lateral direction of movement and in a second pass with a second lateral direction of movement to get the desired random cross hatched pattern of the type illustrated in FIG. 16A and increase the $R_a$ from two to four to approximately eighteen to thirty.

Although the surface of the steel shaft can be finished and polished down to a much lower an $R_a$ rating, the foregoing process indicates that abrasive techniques including application of wet or dry sandpaper are implemented to form a cross hatched pattern of grooves and lands to achieve an $R_a$ rating of from eighteen to thirty, a far higher $R_a$ rating than that which could have been achieved were smoothness the desired object of the invention.

The following steps may be carried out to treat an aluminum shaft to successfully function in a bearing of the present invention:
1. Honing the aluminum shaft to achieve a slightly undersized geometric dimension or lathe cutting or machining the aluminum shaft to the desired geometry;
2. Hard anodizing the surface of the shaft;
3. Finish honing the anodized shaft to achieve finished geometric dimension; and
4. Honing the anodized aluminum surface with approximately two strokes of a Sunnen honing stone to achieve desired surface texture as described below.

To provide appropriate surface treatment for an aluminum sleeve, the following steps can be implemented:
1. Machining the aluminum bore to a slightly undersized dimension;
2. Hard anodizing the aluminum bore, which results in a dimensional build up of the bore;
3. Honing the anodized aluminum bore to the desired geometry; and
4. Honing the anodized aluminum bore with approximately two strokes of a Sunnen honing stone to achieve the desired surface texture (Sunnen Products Company, St. Louis, Mo.: For Step 3 honing, use Sunnen Stone No. K12-A55 (aluminum oxide, 220 grit, hardness of 5). For Step 4 honing, use Sunnen Stone No. K12-A47 (aluminum oxide, 150 grit, hardness of 7).

Although a limited number of material treatment procedures have been described above to achieve operative surface texture, any one or more of the essentially equivalent surface finishing techniques listed below could be implemented using existing techniques to achieve the required $R_a$ rating and air reservoir ratios:
1. Honing;
2. Etching;
3. Centerless grinding;
4. Ion implanting;
5. Shot peening;
6. Two-step machining/etching;
7. Burnishing;
8. EDM (electric discharge machine);
9. Plasma coating; and
10. Other equivalent techniques.

In one embodiment of the invention, the following dimensions were found to yield highly acceptable bearing performance;
1. shaft diameter: 0.4060 inches
2. sleeve bore diameter: 0.40625 inches
3. bearing clearance (radial): 0.000125 inches nominal.

For the various material combinations listed in Table 1, various advantages and disadvantages have been observed or noted. The most reliable combination represents implementation of a steel sleeve on a ceramic shaft. The advantages of this combination are as follows:
1. Closely matched thermal coefficients of expansion;
2. A sleeve made from hardened 440C stainless steel can also function as the rotor of a hysteresis synchronous motor, avoiding the requirement for a permanent magnet rotor; and
3. High resistance to corrosion.

As to the combination of a hard anodized aluminum sleeve on a hardened steel shaft, the following advantages and disadvantages have been observed:

1. Steel shafts can be fabricated by well known and easily implemented gauge pin manufacturing techniques at reasonable cost to yield a surface textured shaft with excellent geometry;
2. The aluminum sleeve is easily machined and can be hard anodized to yield a hard, readily honed bearing surface; and
3. The dissimilar coefficients of thermal expansion of aluminum and steel limit the operating temperature range of the bearing.

The following advantages and disadvantages have been noted from observation of bearings fabricated using hard anodized aluminum for both the sleeve and shaft:
1. The identical thermal coefficient of expansion enables operation over wide temperature ranges; and
2. Aluminum materials easily machined.

As to the use of a ceramic sleeve and shaft, the following advantages and disadvantages have been noted:
1. Identical thermal coefficient of expansion permits operation over wide temperature ranges; and
2. The material is a highly stable material.

Dry lubricant can by applied to one or both of the bearing surfaces to minimize frictional wear from commencement of bearing rotation until bearing liftoff occurs at approximately seventy-five to two hundred and twenty-five surface feet per minute. Between 0 velocity and liftoff velocity during both start-up and shut down, the bearing surfaces contact each other and function as a contact bearing. Dry lubricant functions exclusively during this transition velocity region and reduces frictional wear of the two contacting bearing surfaces. Dry lubricant is unnecessary to cause the present invention to function.

To limit contact phase operation bearing surface wear, the sleeve bore and shaft may be treated with tungsten disulfide or a boron nitrite based dry lubricant.

For a bearing including a ceramic sleeve and a ceramic shaft, dry lubricant is typically not used. For the steel sleeve/ceramic shaft embodiments, dry lubricant may be applied to the sleeve bore. For aluminum/steel bearing surfaces, lubricant may be applied to both surfaces.

Figure 18:
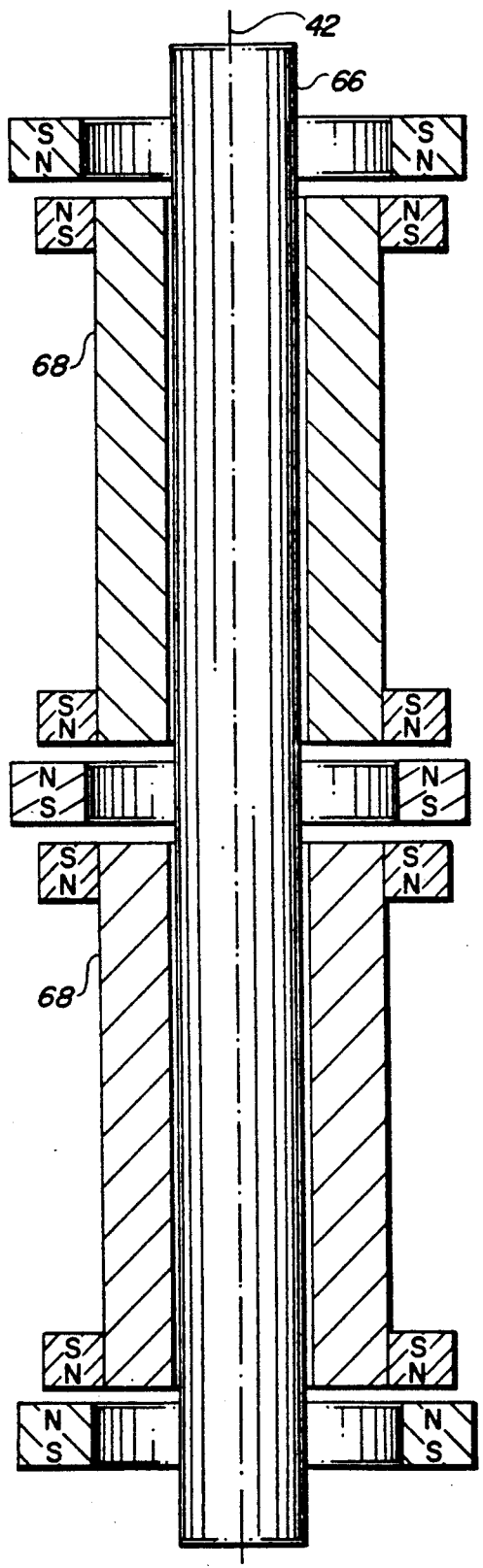
FIG 18 illustrates an embodiment of the invention including a pair of counter-rotating sleeves on a non-rotating bearing shaft.

The present invention can be implemented in various other embodiments in addition to the specific embodiments described above. For example, FIG. 18 illustrates the use of two counter-rotating sleeves on a common fixed shaft. A series of magnetic axial thrust bearings are coupled as shown to maintain the requisite axial alignment of the various bearing elements.

Figure 19:
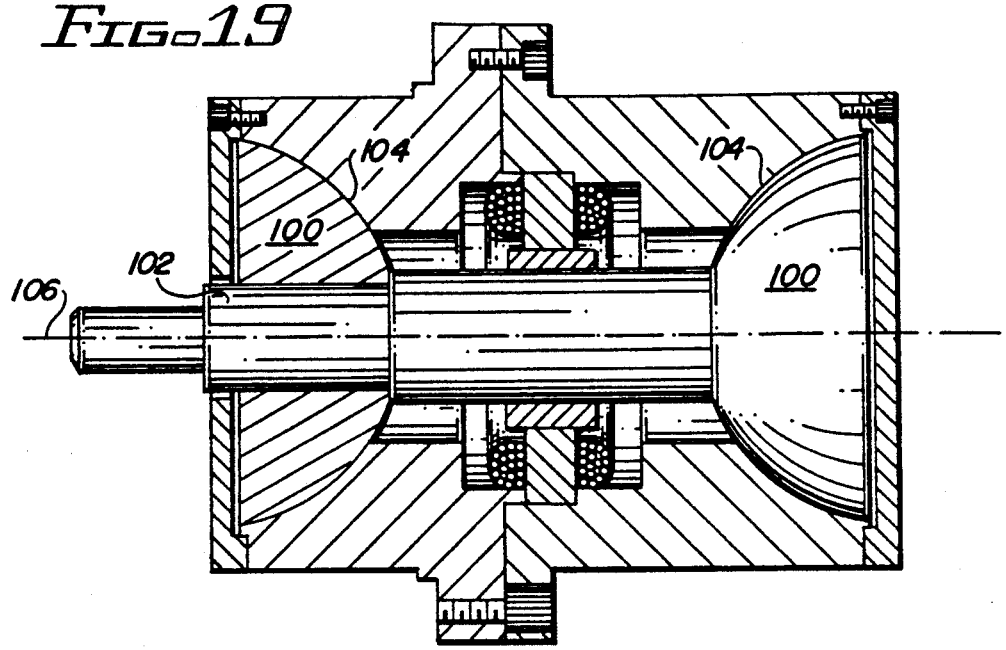
FIG. 19 illustrates a sectional view of an embodiment of the invention including spherical bearing surfaces.

Referring now to FIG. 19, a spherical rotating bearing element 100 is rigidly coupled to motor shaft 102 and interfaces with a matching, stationary spherical bearing surface 104. In the FIG. 19 embodiment of the invention, an adjusting mechanism must be provided to adjust the relative position of rotating bearing surfaces 100 with respect to longitudinal axis 106 to provide an appropriate gap dimension as explained above. Such adjustment could be accomplished by providing an adjustable hub, adjustment screws or even by appropriately selected shims.

Figure 20:
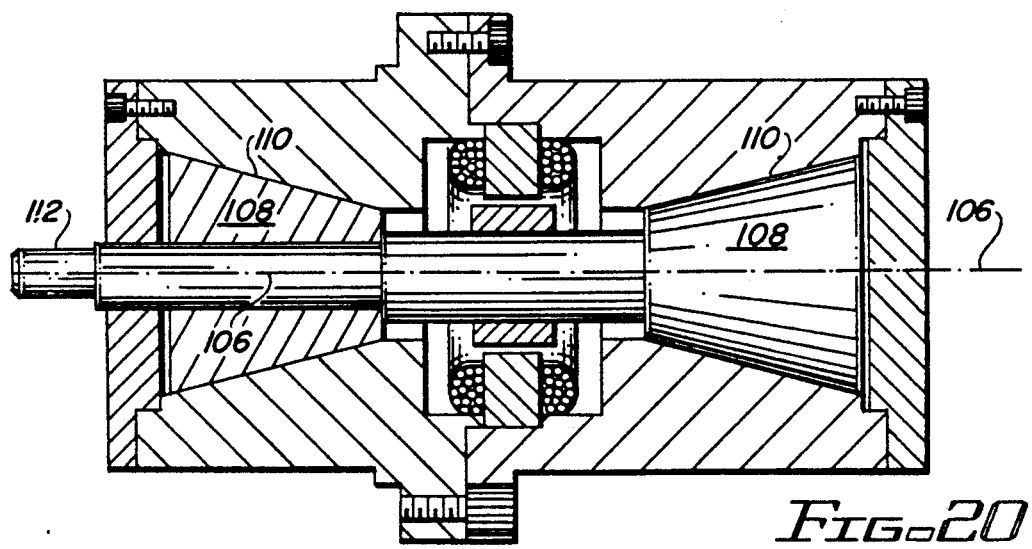
FIG. 20 illustrates a sectional view of an embodiment of the invention including bearing surfaces formed as conic sections.

Referring now to FIG. 20, the bearing assemblies of the present invention are fabricated as conic sections including a rotating conic bearing surface 108 and a stationary conic bearing surface 110. Bearing surface 108 is rigidly coupled to a rotating shaft 112. As was the case with the spheric section bearing assembly illustrated in FIG. 19, adjustment of at least one of the two bearing surfaces 108 with respect to longitudinal axis 112 must be provided by appropriate adjusting means such as shims, screws or adjustable hubs.

In both the FIG. 19 and 20 embodiments of the invention, the rotating and stationary bearing surfaces must be carefully matched as, for example, by applying a fine grit abrasive material between the rotating surfaces to wear in and match the adjacent bearing surfaces. It may also be possible by appropriate, highly accurate machining techniques to avoid such an abrasive wearing step. Upon completion of such abrasive matching procedures, the resulting bearing surface texture must be evaluated to determine whether further bearing surface treatment is required to provide the appropriate $R_a$ surface roughness required for appropriate operation of the present invention.

Figure 21B:
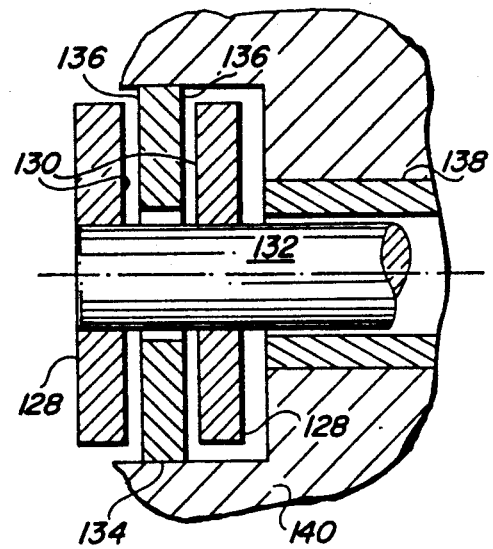
FIGS. 21A, B and sectional views of self-pressurizing gas supported bearings configured as axial thrust control bearings.
Figure 21C:
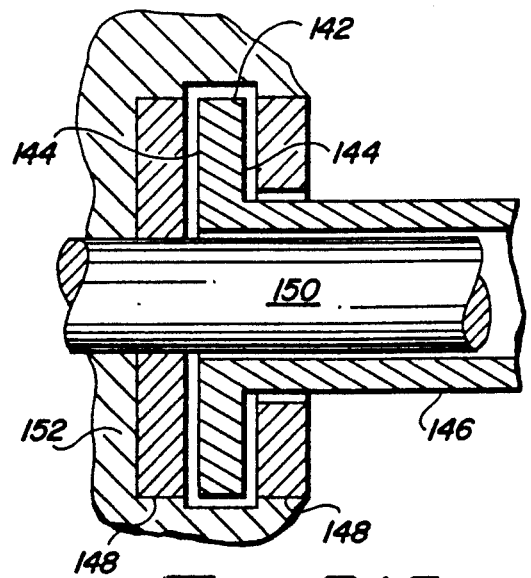
Figure 21A:
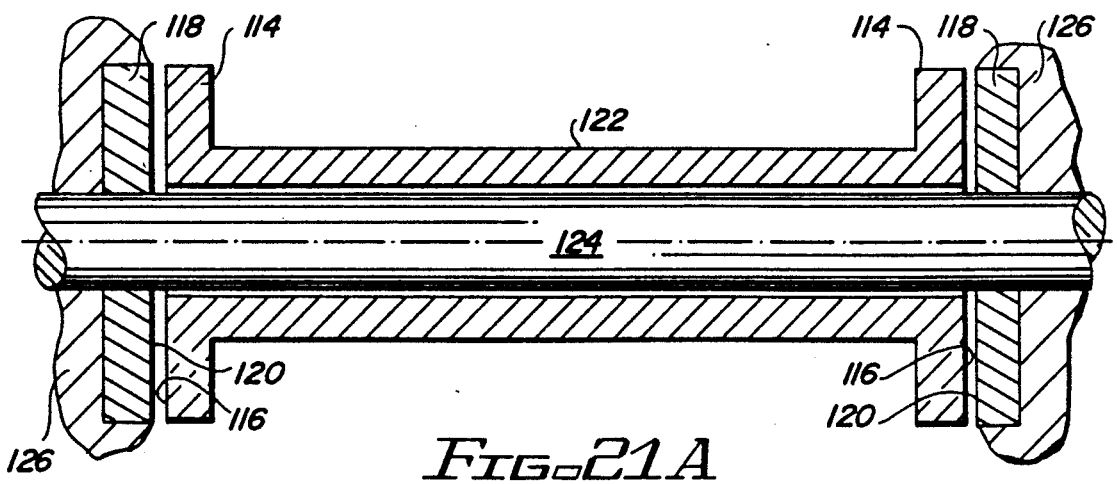

Referring now to FIG. 21A, the bearing assemblies of the present invention are fabricated as annular disc sections including rotating discs 114 with bearing surface 116 and stationary discs 118 with bearing surfaces 120. Rotating discs 114 are rigidly coupled to a rotating sleeve 122. A cylindrical bearing shaft 124 is positioned coaxially within bearing sleeve 122 having ends which are rigidly coupled together with disc 118 to housing 126.

The bearing illustrated in FIG. 21A functions as an axial thrust control bearing. The discs are matched to provide an appropriate gap dimension and surface $R_a$ as explained above.

A bearing of this configuration with thrust bearings on each end as shown in FIG. 21A can operate horizontally or vertically. A bearing with thrust surfaces on one end only can be operated in a vertical attitude with the thrust surfaces supporting a load.

FIG. 21B illustrates a bearing that includes discs 128 with thrust surfaces 130 rigidly coupled to rotating shaft 132. Disc 134 with thrust surfaces 136 is rigidly coupled along with bearing sleeve 138 to the housing 140.

FIG. 21C illustrates a bearing that includes disc 142 with thrust surfaces 144 rigidly coupled to rotating sleeve 146. Discs 148 are rigidly coupled along with bearing shaft 150 to the housing 152.

Although only specific embodiments of these axial thrust control bearings are illustrated in FIGS. 21A, B and C, the application of gas supported air bearings as axial thrust control bearing assemblies could be modified in numerous ways readily understandable to one of ordinary skill in the art based upon principals illustrated in FIG. 21.

Numerous benefits are achieved by implementation of the present invention. The unique and interrelated combination of bearing geometry, $R_a$ roughness, ratio of air reservoirs to bearing surface area and aspect ratio create an extraordinarily high bearing stiffness on the order of 30,000 to 50,000 pounds per inch.

The unique structure of the present invention also results in a rapid stiffness build up as operating velocity increases from start up and results in extremely low speed lift off of one bearing surface relative to the other. The present invention experiences lift off at from approximately seventy-five to two hundred and twenty-five surface feet per minute. One prior art herringbone bearing assembly does not attain liftoff until approximately six hundred surface feet per minute.

The bearing of the present invention can also operate at extremely high RPM's. A prototype of the present invention was successfully tested at 40,000 RPM, the maximum RPM of the prototype drive motor. Prior art herringbone bearings are typically limited to maximum RPM operation at on the order of about 30,000 RPM.

The extraordinarily high bearing stiffness ratings achieved by the present invention (on the order of 30,000 to 50,000 pounds per inch) permits operation of the bearing in any attitude including horizontal, vertical or inclined. The bearing stiffness ratings of some prior art herringbone systems are insufficient, require operation in a vertical attitude and cannot successfully operate for any significant amount of time with inclinations of even ten degrees away from vertical.

The bearing of the present invention can also be operated with either a clockwise or counterclockwise rotation direction. The prior art herringbone bearings are unidirectional in view of the unique herringbone groove pattern and the requirement to pump air in a single direction to pressurize the bearing.

The present invention operates as a closed system without a requirement for an external air supply. Herringbone bearing assemblies require a source of air which is pumped through the bearing. Unless operated in a debris free environment, herringbone air bearings are nearly always contaminated by airborne debris, causing catastrophic bearing failure.

The bearing of the present invention can operate at high altitude and has been tested at altitudes up to 20,000 feet without significant performance degradation.

The unique structure of the bearing of the present invention results in extremely low bearing surface wear. A prototype of the present invention has been tested for more than 40,000 start/stop cycles and although extremely high resolution measuring equipment was used to inspect for wear, no measurable wear could be discerned. The operating lifetime of this bearing is therefore predicted to be well in excess of 20,000 start/stop cycles. Some prior art herringbone bearing assemblies are typically specified as having a lifetime of only 10,000 start/stop cycles. A prototype of the present invention has been operating continuously in excess of 22,000 hours to date with no evidence of wear. The operating lifetime of prior art ball bearing assemblies is typically on the order of about 2000 hours at speeds above 20,000 RPM.

The unique structure of the present invention provides a full length bearing assembly across the entire opposing surface of the bearing sleeve and the bearing shaft to provide very large bearing support surface areas providing excellent shock resistance to shipping and handling damage. Prior art herringbone bearing assemblies rely on relatively short, small area bearing surfaces.

If the materials used in the bearing sleeve and shaft are properly matched with respect to thermal coefficients of expansion as can readily be done, extremely wide temperature operating ranges can be readily achieved.

Because the bearing assembly of the present invention experiences extremely low frictional torque, a negligible heat rise is achieved, typically on the order of less than about 5° F. at an operating RPM of about 22,000 RPM. This limited heat rise is due primarily to motor heating.

The utilization of dry lubricant (when lubricant is used with the bearing of the present invention) instead of a wet lubricant as used in prior art ball bearing assemblies completely eliminates the lubricant contamination problems experienced by prior art ball bearing units.

For optical applications, lubricant contamination of the optical surfaces is thus completely avoided by use of the present invention.

The random redistribution of the wet lubricant used in prior art ball bearings causes random variations in the ball bearing drag forces. These random redistributions contribute to rotational velocity error in the rotating member. The elimination of the wet lubricant of the present invention gas bearing typically improves the velocity stability by a factor of 2 over prior art ball bearings.

Because the present invention utilizes a near-infinite number or random lands and grooves and inexpensive manufacturing techniques to achieve the required bearing surface configuration, the bearing of the present invention can be manufactured at extremely low cost. The requirement of prior art herringbone bearings for fixed, highly precise geometry patterns result in close manufacturing tolerances and high manufacturing costs.

It will be apparent to those skilled in the art that the disclosed self-pressurizing gas supported bearing may be modified in numerous other ways and may assume many other embodiments in addition to the preferred forms specifically set out and described above. Accordingly, it is intended by the appended claims to cover all such modifications of the invention which fall within the true spirit and scope of the invention.

I claim:

1. A self-pressurizing gas supported bearing comprising:
   a. a cylindrical bearing sleeve having a longitudinal axis and a cylindrical inner surface including a first bearing surface with a random surface texture having a first $R_a$ roughness profile;
   b. a cylindrical bearing shaft positioned coaxially within the bearing sleeve and having a cylindrical outer surface including a second bearing surface with a random surface texture having a second $R_a$ roughness profile, wherein the sum of the first and second $R_a$ roughness profiles falls within the range of from about 18 to about 60 and wherein the bearing sleeve and shaft are aligned along the longitudinal axis such that the first and second bearing surfaces overlap;
   c. drive means for establishing a relative rotational velocity between the bearing sleeve and the bearing shaft where the relative rotational velocity generates a bearing stiffness force and causes the overlapping bearing surfaces of the sleeve and shaft to lift off and break contact; and
   d. the bearing sleeve and shaft having a geometry to maintain a predetermined mean spacing between the first bearing surface of the sleeve and the overlapping second bearing surface of the shaft of from a minimum of about seventy-five micro inches to a maximum mean spacing where the first and second bearing surfaces fail to lift off and break contact.

2. The bearing of claim 1 further including longitudinal alignment means coupled to the bearing sleeve and to tee bearing shaft for maintaining a fixed longitudinal alignment between the bearing sleeve and the bearing shaft.

3. The bearing of claim 2 wherein the bearing sleeve includes a first end section, wherein the bearing shaft includes a first end section and wherein the longitudinal alignment means includes a first thrust bearing coupled to the first end section of the bearing sleeve and to the first end section of the bearing shaft.

4. The bearing of claim 1 wherein the first bearing surface includes a first length, and the second bearing surface includes a second length.

5. The bearing of claim 4 wherein the bearing shaft is rotationally fixed, wherein the drive means rotates the bearing sleeve about the bearing shaft, and wherein the first length of the rotating bearing sleeve is less than the second length of the fixed bearing shaft.

6. The bearing of claim 4 wherein the bearing sleeve is rotationally fixed, wherein the drive means rotates the bearing shaft relative to the fixed bearing sleeve, and wherein the first length of the bearing sleeve is less than the second length of the bearing shaft.

7. The bearing of claim 3 wherein the thrust bearing includes a magnetic thrust bearing assembly.

8. The bearing of claim 7 wherein the magnetic thrust bearing assembly includes:
   a. a first annular magnet coupled to the first end section of the bearing shaft; and
   b. a second annular magnet coupled to the first end section of the bearing shaft.

9. The bearing of claim 8 wherein the first and second annular magnets each include north and south poles and wherein the first and second annular magnets are placed in close proximity to each other with matching magnetic poles.

10. The bearing of claim 9 wherein:
    a. the bearing shaft and the bearing sleeve each include a second end section; and
    b. the longitudinal alignment means includes a second thrust bearing coupled to the second end section of the bearing sleeve and to the second end section of the bearing shaft.

11. The bearing of claim 10 wherein the second thrust bearing includes a magnetic thrust bearing assembly.

12. The bearing of claim 11 wherein the magnetic thrust bearing assembly includes:
    a. a first annular magnet coupled to the second section of the bearing shaft; and
    b. a second annular magnet coupled to the second end section of the bearing shaft.

13. Apparatus for rotating a load having a longitudinal axis extending through a center of gravity, comprising:
    a. a bearing assembly coupled to rotate the load about the longitudinal axis and including
       i. a cylindrical bearing sleeve centrally aligned with the longitudinal axis and having a cylindrical surface including a first bearing surface including a random surface texture with a first $R_a$ roughness profile;
       ii. a cylindrical bearing shaft positioned coaxially within the bearing sleeve and having a cylindrical outer surface with a second bearing surface including a random surface texture with a second $R_a$ roughness profile, wherein the sum of the first and second $R_a$ roughness profiles falls within the range of from about 18 to about 60 and wherein the bearing sleeve and bearing shaft are aligned along the longitudinal axis such that the first and second bearing surfaces overlap;
    b. drive means for establishing a relative rotational velocity between the bearing sleeve and the bearing shaft where the relative rotational velocity generates a bearing stiffness force and causes the overlapping bearing surfaces of the sleeve and shaft to lift off and break contact; and c. the bearing sleeve and shaft having a geometry dimensional to maintain a predetermined mean spacing between the first bearing surface of the sleeve and the overlapping second bearing surface of the shaft of from a minimum of about seventy-five micro inches to a maximum mean spacing where the first and second bearing surfaces fail to lift off and break contact.

14. A self-pressurizing gas supported bearing comprising:

a. a first bearing element having a longitudinal axis and a curved inner bearing surface with a random surface texture having a first $R_a$ roughness profile;

b. a second bearing element positioned coaxially within the first bearing element and having a curved outer bearing surface with a random surface texture having a second $R_a$ roughness profile, wherein the sum of the first and second $R_a$ roughness profiles falls within the range of from about eighteen to about sixty and wherein the first and second bearing elements are aligned along the longitudinal axis such that the inner and outer bearing surfaces overlap;

c. drive means for establishing a relative rotational velocity between the inner and outer bearing surfaces where the relative rotational velocity generates a bearing stiffness force and causes the overlapping bearing surfaces to lift off and break contact; and d. the inner and outer bearing surfaces having a geometry dimensioned to maintain a predetermined mean spacing between the overlapping surfaces of the first and second bearing elements of from a minimum mean spacing of about seventy-five microinches to a maximum mean spacing where the inner and outer bearing surfaces fail to lift off and break contact.

15. The bearing of claim 14 further including longitudinal alignment means coupled to the first bearing element and to the second bearing element for maintaining a fixed longitudinal alignment between the inner and outer bearing surfaces.

16. The bearing of claim 14 wherein the maximum mean spacing is equal to or less than about three hundred microinches.

17. The bearing of claim 14 wherein the curved inner and outer bearing surfaces are configured as concentric cylinders.

18. The bearing of claim 14 wherein the curved inner and outer bearing surfaces are configured as concentric cones.

19. The bearing of claim 14 wherein the curved inner and outer bearing surfaces are configured as concentric spheric sections.

20. The bearing of claim 15 wherein the first bearing element includes a cylindrical bearing sleeve and wherein the second bearing element includes a cylindrical bearing shaft.

21. The bearing of claim 20 wherein the bearing sleeve includes a first end section, wherein the bearing shaft includes a first end section and wherein the longitudinal alignment means includes a first thrust bearing coupled to the first end section of the bearing sleeve and to the first end section of the bearing shaft.

22. The bearing of claim 21 including:

a. a first thrust bearing element coupled to and extending radially outward from the first end section of the bearing sleeve and oriented perpendicular to the longitudinal axis with a random surface texture having a first $R_a$ roughness profile;

b. a second thrust bearing element coupled to and extending radially outward from the first end section of the bearing shaft and oriented perpendicular to the longitudinal axis and substantially parallel to the first thrust bearing element with a random surface texture having a second $R_a$ roughness profile, wherein the sum of the first and second $R_a$ roughness profiles falls within the range of from about 18 to about 60 and wherein the first and second thrust bearing elements overlap; and c. the first and second thrust bearing elements each having a geometry dimensioned to maintain a predetermined means spacing between the overlapping surfaces to generate a thrust pressure adequate to maintain a relatively fixed longitudinal alignment between the bearing shaft and sleeve.

* * * * *